(12) United States Patent
Beuterbaugh et al.

(10) Patent No.: US 9,540,560 B2
(45) Date of Patent: Jan. 10, 2017

(54) METHODS AND SYSTEMS FOR ACIDIZING SUBTERRANEAN FORMATIONS

(71) Applicant: Halliburton Energy Services, Inc., Houston, TX (US)

(72) Inventors: Aaron Michael Beuterbaugh, Spring, TX (US); Enrique Antonio Reyes, Tomball, TX (US); Alyssa Smith, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 271 days.

(21) Appl. No.: 14/394,826

(22) PCT Filed: Dec. 13, 2013

(86) PCT No.: PCT/US2013/075067
§ 371 (c)(1),
(2) Date: Oct. 16, 2014

(87) PCT Pub. No.: WO2015/088561
PCT Pub. Date: Jun. 18, 2015

(65) Prior Publication Data
US 2016/0264852 A1    Sep. 15, 2016

(51) Int. Cl.
*E21B 43/22* (2006.01)
*C09K 8/74* (2006.01)
(Continued)

(52) U.S. Cl.
CPC ............. *C09K 8/74* (2013.01); *E21B 43/25* (2013.01); *C02F 11/06* (2013.01)

(58) Field of Classification Search
CPC ........ C02F 11/06; Y10S 210/906; C09K 8/74; E21B 43/25
See application file for complete search history.

(56) References Cited

U.S. PATENT DOCUMENTS

| 3,336,221 A | 8/1967 | Raulston |
| 4,702,849 A | 10/1987 | Penny |

(Continued)

FOREIGN PATENT DOCUMENTS

| EP | 404421 A1 | 12/1990 |
| EP | 2371923 A1 | 10/2011 |

(Continued)

OTHER PUBLICATIONS

Al-Douri, et al., A New Organic Acid to Stimulate Deep Wells in Carbonate Reservoirs, SPE International Symposium on Oilfield Chemistry held in the Woodlands, TX, Apr. 2013, SPE 164110.

(Continued)

*Primary Examiner* — Zakiya W Bates
(74) *Attorney, Agent, or Firm* — McDermott Will & Emery LLP; Craig Roddy

(57) ABSTRACT

A method for acidizing subterranean formations may include providing a treatment fluid comprising an aqueous carrier fluid, an acid, and a chelating agent comprising N-(phosphonomethyl)iminodiacetic acid, the treatment fluid having a pH at or below that at which carboxylic or phosphonic acid groups of the N-(phosphonomethyl)iminodiacetic acid are protonated and the chelating agent is ineffective for complexing a metal ion; introducing the treatment fluid into a wellbore penetrating a subterranean formation comprising a carbonate mineral; reacting the acid with the carbonate mineral in the presence of the chelating agent, such that the acid at least partially spends as the pH of the treatment fluid rises; and complexing a metal ion with the chelating agent once the pH of the treatment fluid rises above a $pK_a$ value for one or more of the carboxylic or phosphonic acid groups of the N-(phosphonomethyl)iminodiacetic acid.

20 Claims, 1 Drawing Sheet

(51) Int. Cl.
*E21B 43/25* (2006.01)
*C02F 11/06* (2006.01)

(56) References Cited

U.S. PATENT DOCUMENTS

| | | |
|---|---|---|
| 4,747,975 A | 5/1988 | Ritter |
| 5,096,595 A | 3/1992 | Hwa et al. |
| 5,171,460 A | 12/1992 | Underdown |
| 5,259,974 A | 11/1993 | Chen et al. |
| 5,409,614 A | 4/1995 | Gallup et al. |
| 5,529,125 A | 6/1996 | Di Lullo Arias et al. |
| 2007/0158067 A1 | 7/2007 | Xiao et al. |
| 2011/0024366 A1 | 2/2011 | Keatch et al. |
| 2013/0023449 A1 | 1/2013 | Heath et al. |
| 2013/0281329 A1 | 10/2013 | De Wolf et al. |

FOREIGN PATENT DOCUMENTS

| | | |
|---|---|---|
| WO | 9721905 A1 | 6/1997 |
| WO | 2011120655 A1 | 10/2011 |
| WO | 2015088561 A1 | 6/2015 |
| WO | 2015088675 A1 | 6/2015 |

OTHER PUBLICATIONS

Wang et al., Iron Sulfide Removal: A Nonacidic Alternative to Hydrochloric Acid Treatment, SPE European Formation Damage Conference and Exhibition held in Noordwijk, The Netherlands, Jun. 2013, SPE 165199.

International Search Report and Written Opinion for PCT/US2014/064095 dated Feb. 17, 2015.

International Search Report and Written Opinion for PCT/US2013/075067 dated Sep. 26, 2014.

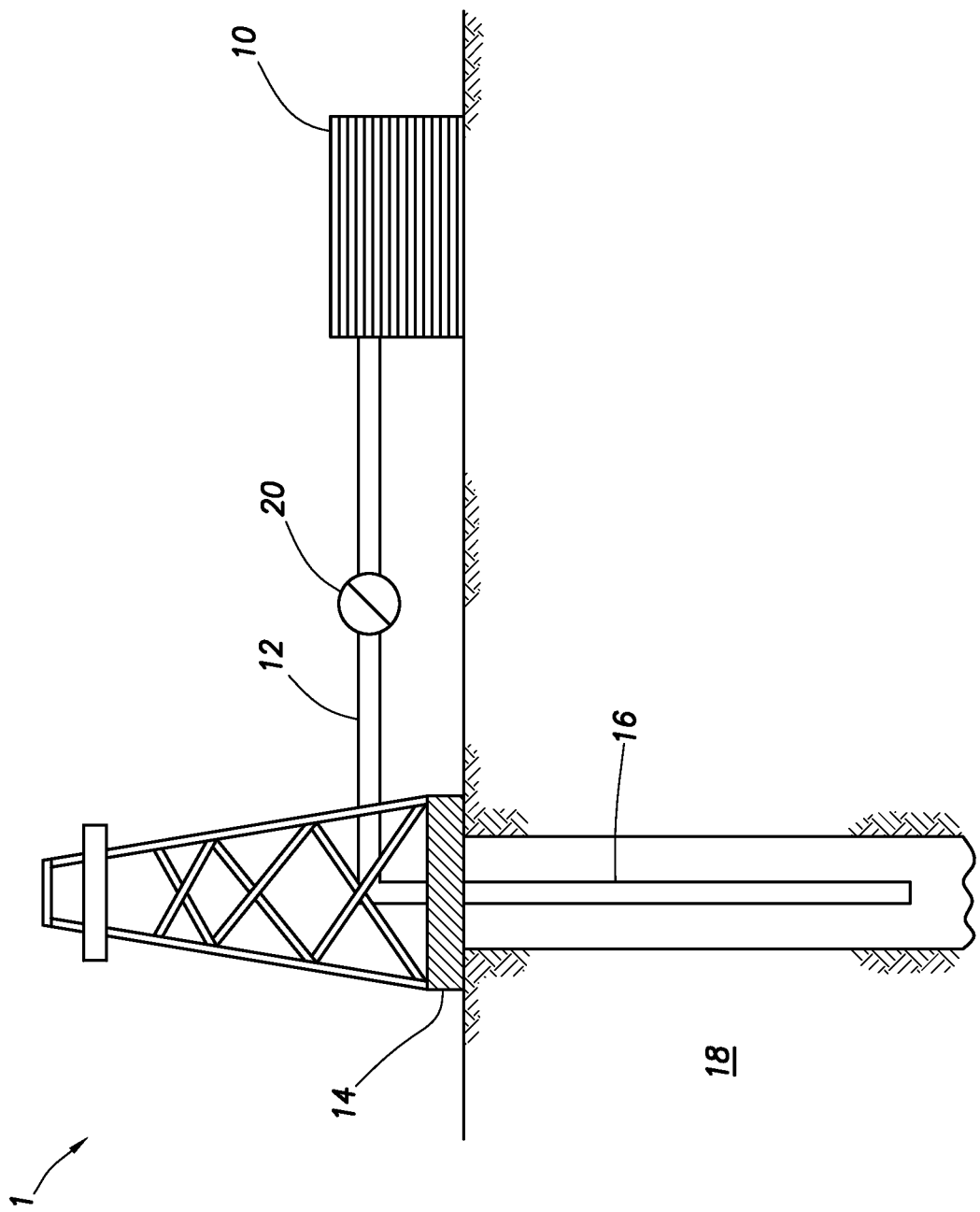

METHODS AND SYSTEMS FOR ACIDIZING SUBTERRANEAN FORMATIONS

BACKGROUND

The present disclosure generally relates to acidizing subterranean formations, and, more specifically, to methods for acidizing subterranean formations in the presence of a chelating agent that is initially ineffective at complexing a metal ion.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Acidizing operations may be performed to stimulate a subterranean formation to increase production of a hydrocarbon resource therefrom. Introduction of the acidizing fluid to the subterranean formation may take place at matrix flow rates above or below the fracture gradient of the matrix. During a matrix acidizing operation, an acid-soluble material in the subterranean formation is dissolved by one or more acids to expand flow pathways in the subterranean formation, to create new flow pathways in the subterranean formation, to remove acid-soluble precipitation damage in the subterranean formation, and/or to increase flow to/from the matrix. The acid-soluble material may be part of the native formation matrix. Illustrative acid-soluble materials native to the formation matrix that may be dissolved by an acid include, but are not limited to, carbonates, silicates, and aluminosilicates. Other substances can also be dissolved during the course of performing an acidizing operation, and the foregoing substances should not be considered to limit the scope of substances that may undergo acidization.

Carbonate formations contain minerals that comprise a carbonate anion (e.g., calcite (calcium carbonate) and dolomite (calcium magnesium carbonate)). When acidizing a carbonate or dolomite formation, the acidity of the treatment fluid is usually sufficient to solubilize the matrix to a carbonate anion and leaching the metal ion ($Ca^{2+}$, $Mg^{2+}$) into the treatment fluid. The carbonate anion will further decompose to the carbon dioxide and water. Both mineral acids (e.g., hydrochloric acid) and organic acids (e.g., acetic and formic acids) can be used in carbonate formations, often with similar degrees of success to achieve this dissolution profile.

Siliceous formations include minerals such as, for example, zeolites, clays, and feldspars. As used herein, the term "siliceous" refers to a substance having the characteristics of silica, including silicates and/or aluminosilicates. Dissolution of siliceous materials through acidization is thought to be considerably different than acidizing carbonate materials because many acids that effectively acidize carbonate materials have little effect on siliceous materials. In contrast, hydrofluoric acid, another mineral acid, can react very readily with siliceous materials to promote their dissolution.

In addition to siliceous materials, many types of siliceous formations can also contain varying amounts of carbonate materials. Most sandstone formations, for example, contain about 40% to about 98% sand quartz particles (i.e., silicas), bonded together by various amounts of cementing materials, which may be siliceous in nature (e.g., aluminosilicates or other silicates) or non-siliceous in nature (e.g., carbonates, such as calcite).

In some instances, it can be desirable to remove carbonate materials from a siliceous formation prior to acidizing the siliceous material therein. A leading reason to remove a carbonate material separately from a siliceous material is that calcium ions liberated from the carbonate material can react readily with fluoride ions of hydrofluoric acid to form highly insoluble calcium fluoride that reduce flow through the matrix.

Precipitation of formation cations due to acidizing carbonate can also be problematic. Although most carbonate mineral cations can be dissolved with strong acid treatment fluids, dissolution of the formation matrix spends the acid. As the pH of the treatment fluid rises, cations can precipitate and damage the formation.

The precipitates formed during matrix acidizing, whether from siliceous or carbonate portions of the formation, may reduce the increased permeability achieved during acidizing, which may reduce the hydrocarbon production capacity of the formation.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to one having ordinary skill in the art and the benefit of this disclosure.

FIG. 1 shows an illustrative schematic of a system that can deliver treatment fluids of the present invention to a downhole location.

DETAILED DESCRIPTION

The present disclosure generally relates to acidizing subterranean formations, and, more specifically, to methods for acidizing subterranean formations in the presence of a chelating agent that is initially ineffective at complexing a metal ion.

The treatment fluids and methods described herein utilize a chelating agent comprising N-(phosphonomethyl)iminodiacetic acid, which has $pK_a$ values of about 2.0, 2.3, 5.6, and 10.8. Without being limited by theory, it is believed that the lower $pK_a$ of N-(phosphonomethyl)iminodiacetic acid (e.g., as compared to other chelating agents like glutamic acid diacetic acid (GLDA) having $pK_a$ values of about 2.6 and about 3.5) may result in stabilization rather than precipitation of formation cations (e.g., calcium, magnesium, iron, and aluminum ions) and corrosion cations (e.g., iron ions) at lower pH values. The ability to use lower pH values for a treatment fluid in a matrix acidizing operation may enhance the erosion of the formation matrix, thus increasing the effectiveness of the acidizing treatment.

Further, N-(phosphonomethyl)iminodiacetic acid is stable at higher temperatures as compared to other chelating agents like ethylenediaminetetraacetic acid (EDTA) and propylenediaminetetraacetic acid (PDTA). This increased temperature stability (e.g., in excess of 350° F.) allows for treating higher temperature formations for longer times.

It should be noted that when "about" is used herein at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, particle sizes, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

Treatment fluids described herein may, in some embodiments, comprise an aqueous carrier fluid, an acid (an acid-generating compound or both), and a chelating agent that comprises N-(phosphonomethyl)iminodiacetic acid.

In some embodiments, the chelating agent may comprise the acid form of the N-(phosphonomethyl)iminodiacetic acid. In some embodiments, the chelating agent may comprise the neutral form of the N-(phosphonomethyl)iminodiacetic acid. In other embodiments, the chelating agent may comprise a salt form of the N-(phosphonomethyl)iminodiacetic acid, including an alkali metal salt of the N-(phosphonomethyl)iminodiacetic acid. Other salt forms of the chelating agent may also be used and include, for example, an ammonium salt form or a quaternary ammonium salt form.

In some embodiments, the chelating agent may further comprise at least one of an aminopolycarboxylic acid, EDTA, PDTA, nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, and the like, any salt thereof, any derivative thereof, and any combination thereof. Examples of aminopolycarboxylic acid chelating agents suitable for use in conjunction with the present disclosure may include, but are not limited to, GLDA, methylglycine diacetic acid (MGDA), β-alanine diacetic acid N-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyliminodiacetic acid, 2-(2-carboxyethylamino)succinic acid (CEAA), 2-(2-carboxymethylamino)succinic acid (CMAA), diethylenetriamine-N,N''-disuccinic acid, triethylenetramine-N,N'''-disuccinic acid, 1,6-hexamethylenediamine-N,N'-disuccinic acid, tetraethylenepentamine-N,N'''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N, N-diacetic acid, aspartic acid-N-monoacetic acid, and the like, any salt thereof, any derivative thereof, and any combination thereof.

In some embodiments, the concentration of the chelating agent in the treatment fluid may range from a lower limit of about 0.1%, 0.5%, 1%, % 5, or 10% by weight of the treatment fluid to an upper limit of about 40%, 25%, 10%, or 5% by weight of the treatment fluid, and wherein the concentration of the chelating agent may range from any lower limit to any upper limit and encompasses any subset therebetween.

Examples of aqueous carrier fluids suitable for use in conjunction with the treatment fluids described herein may include, for example, fresh water, acidified water, salt water, seawater, brine (e.g., a saturated salt solution), or an aqueous salt solution (e.g., a non-saturated salt solution). Aqueous carrier fluids may be obtained from any suitable source, provided that it does not contain in significant concentrations components that might adversely affect the stability and/or performance of the treatment fluid.

In some instances, the treatment fluids described herein may further comprise aqueous-miscible fluids. Examples of suitable aqueous-miscible fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, ethylene glycol, and polyethylene glycol), polyglycol amines, polyols, and the like, any derivative thereof, and any combination thereof. In some instances, the amount of aqueous-miscible fluids in the treatment fluid may range from a lower limit of about 3% or 5% by weight of the aqueous base fluid to an upper limit of about 8% or 5% by weight of the aqueous base fluid, and wherein the amount of aqueous-miscible fluids in the treatment fluid may range from any lower limit to any upper limit and encompasses any subset therebetween.

Examples of acids suitable for use in conjunction with the treatment fluids described herein may include, but are not limited to, hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, and the like, and any combination thereof.

Examples of acid-generating compounds suitable for use in conjunction with the treatment fluids described herein may include, but are not limited to, esters, aliphatic polyesters, orthoesters, poly(orthoesters), poly(lactides), poly (glycolides), poly(e-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, and the like, any derivative thereof, and any combination thereof.

In some embodiments, the treatment fluids described herein may be substantially free of hydrofluoric acid or a hydrofluoric acid-generating compound (e.g., when the formation includes siliceous materials). As used herein, a treatment fluid will be considered to be substantially free of hydrofluoric acid or a hydrofluoric acid-generating compound if there is less than about 0.5% hydrofluoric acid (or generatable hydrofluoric acid) present by weight. In other embodiments, the treatment fluids may be free of hydrofluoric acid or a hydrofluoric acid-generating compound. Hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), and various boron trifluoride complexes. The inclusion or omission of hydrofluoric acid or hydrofluoric acid-generating compounds may be determined, as described below, based on the composition of the subterranean formation, specifically the presence of siliceous material.

In some embodiments, an amount of the acid or acid-generating compound present in the treatment fluid can be sufficient to produce a pH value at which the chelating agent is ineffective for complexing a metal ion. In some embodiments, the concentration of the acid in the treatment fluid may range from a lower limit of about 1%, 5%, or 10% by weight of the treatment fluid to an upper limit of about 70%, 50%, 20%, 15%, 10%, or 5% by weight of the treatment fluid, and wherein the concentration of the acid may range from any lower limit to any upper limit and encompasses any subset therebetween. Since organic acids (e.g., formic acid and acetic acid) are generally less acidic than are mineral acids (e.g., hydrochloric acid and hydrobromic acid), organic acids may be used at higher as well as lower concentrations than mineral acids.

In some embodiments, the treatment fluids described herein can have a pH that is below the $pK_a$ values of the carboxylic or phosphonic acid groups of the N-(phosphonomethyl)iminodiacetic acid. For instance, the carboxylic or phosphonic acid groups of N-(phosphonomethyl)iminodiacetic acid have a $pK_a$ values of about 2.0, 2.3, 5.6, and 10.8. Below a pH value of about 2.0, N-(phosphonomethyl) iminodiacetic acid is fully protonated and believed to be inactive for complexing a metal ion. One of ordinary skill in the art will be able to choose a suitable pH realm for a treatment fluid in order to place a chelating agent therein in a state where it is ineffective for complexing a metal ion. Further factors that may be taken into account in determining a suitable pH for a treatment fluid include, for example, the composition of the subterranean formation and the desired acidizing rate. In various embodiments, the pH of the treatment fluids described may range from a lower limit of about −1, 0, 0.5, or 1 to an upper limit of about 2, 1.5, or 1, and wherein the pH may range from any lower limit to any upper limit and encompasses any subset therebetween.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. One of ordinary skill in the art will be able to formulate a treatment fluid having properties suitable for a given application.

In some embodiments, the treatment fluids and methods described herein can be used in fracture acidizing operations of subterranean formations comprising a carbonate mineral. That is, in some embodiments, the treatment fluids described herein can be introduced to a subterranean formation at or above a fracture gradient pressure of the subterranean formation.

In some embodiments, the treatment fluids and methods described herein can be used in matrix acidizing operations of subterranean formations comprising a carbonate mineral. That is, in some embodiments, the treatment fluids described herein can be introduced to a subterranean formation below a fracture gradient pressure of the subterranean formation.

Some embodiments may involve introducing a treatment fluid described herein (e.g., comprising an aqueous carrier fluid, an acid (an acid-generating compound or both), and a chelating agent that comprises N-(phosphonomethyl)iminodiacetic acid) into a wellbore penetrating a subterranean formation that comprises a carbonate mineral; reacting the acid (or acid generated by the acid-generating compound) with the carbonate mineral in the presence of the chelating agent, such that the acid at least partially spends as the pH of the treatment fluid rises; and complexing a metal ion with the chelating agent once the pH of the treatment fluid rises above a $pK_a$ value for one or more of the carboxylic or phosphonic acid groups of the N-(phosphonomethyl)iminodiacetic acid.

Examples of carbonate minerals that may be present in a subterranean formation may include, but are not limited to, calcite, dolomite, and the like, and any combination thereof. In some instances, the carbonate minerals may be mixed or layered with acid-insoluble minerals.

In some instances, the carbonate minerals may react with the acid (or acid generated by the acid-generating compound) resulting in the bulk erosion of the carbonate mineral, in the formation of wormholes in the carbonate mineral, or in a combination thereof. For example, in some instances, the subterranean formation may comprise calcium carbonate at a sufficient concentration (e.g., about 30% or greater) such that reacting the acid with the carbonate mineral forms predominantly wormholes.

As discussed above, hydrofluoric acid may be used to dissolve a siliceous material in a subterranean formation. Although in some embodiments the treatment fluids described herein may be substantially free of hydrofluoric acid or a hydrofluoric acid-generating compound, the hydrofluoric acid or hydrofluoric acid-generating compound may still be used to treat a siliceous formation in some cases. For example, in some embodiments, a substantially hydrofluoric acid-free treatment fluid (e.g., 0.5% or less) may be used to remove a carbonate mineral that is present in a siliceous-containing formation. That is, in some embodiments, the subterranean formation into which the treatment fluid is introduced may further comprise a siliceous mineral in addition to a carbonate mineral. Thereafter, at least a portion of the siliceous mineral in the subterranean formation may be removed in a separate acidizing stage with a treatment fluid comprising hydrofluoric acid or a hydrofluoric acid-generating compound. Illustrative siliceous materials that may be removed from a subterranean formation following removal of a carbonate mineral can include silicates and aluminosilicates such as, for example, silica, quartz, sandstone, clays, feldspars, and the like.

The metal ion being complexed by the chelating agent is not believed to be particularly limited. Illustrative sources of the metal ion may include, for example, a native carbonate mineral present in the subterranean formation, a non-native carbonate material that was previously introduced to the subterranean formation (e.g., calcium carbonate particles), metal ions being leeched into the subterranean formation through corrosion of a drilling tool or wellbore pipe, for example, or a combination thereof.

Illustrative metal ions that may be present in a subterranean formation due to dissolution of a carbonate mineral may include, but are not limited to, calcium ions, magnesium ions, iron ions, aluminum ions, and any combination thereof. Illustrative metal ions that may be present in a subterranean formation due to corrosion mineral may include, but are not limited to, iron ions, or any other metal ion resulting from the dissolution of iron alloys by an acid. In some embodiments, the metal ion being complexed by the chelating agent may include, for example, a calcium ion, a magnesium ion, an iron ion, and any combination thereof. The metal ion may be complexed with the chelating agent through a direct interaction of the chelating agent with a surface in the subterranean formation (i.e., a carbonate mineral surface), or the metal ion may be complexed by the chelating agent after the metal ion has undergone an initial dissolution by the acid.

The temperature of the subterranean formation into which the treatment fluid is introduced is likewise not believed to be particularly limited. In some embodiments, the subterranean formation may have a bottom hole static temperature of about 100° F. or above, or about 150° F. or above, or about 200° F. or above, or about 250° F. or above, about 300° F. or above, about 350° F. or above, or about 400° F. or above. As will be recognized by one having ordinary skill in the art, as the temperature of the subterranean formation increases, the reaction rate of the acid with a carbonate mineral in the subterranean formation may also increase, which in turn may affect interaction of the acid and the carbonate mineral formation (e.g., bulk erosion, wormhole formation, or a combination thereof).

In some embodiments, the methods described herein may further comprise adsorbing a portion of the chelating agent to a surface in the wellbore and/or subterranean formation, thereby inhibiting scale formation thereon. Without being limited by theory, it is believed that the phosphonate group of the N-(phosphonomethyl)iminodiacetic acid may adsorb to surfaces and inhibit scale formation. As used herein, the term "scale" refers to a mineral or solid salt deposit that forms when the saturation of formation water to one or more minerals is affected by changing physical conditions (such as temperature, pressure, or composition); thus causing minerals and salts previously in solution to precipitate into solids. Scale deposits can form on any surface in a downhole operation (e.g., a formation face, a wellbore tool in the wellbore, equipment at the surface, and the like, and combinations thereof), including subterranean formations, production tubing, gravel packing screens, and other well bore equipment. Scale can develop almost immediately, or build up over time before becoming problematic. The effect scale has on productivity depends on the type, location, and the mass deposited. Scale formation can become so severe as to restrict or even completely choke production. The formation of scale can decrease permeability of the subterranean formation, reduce well productivity and shorten the lifetime of production equipment. In order to clean scale from wells and equipment, it is generally necessary to stop production, which is both time-consuming and costly.

In various embodiments, systems configured for delivering the treatment fluids described herein to a downhole location are described. In various embodiments, the systems can comprise a pump fluidly coupled to a tubular, the tubular containing a treatment fluid that comprises an aqueous carrier fluid, an acid, and a chelating agent comprising an aminopolycarboxylic phosphonic acid (and optionally further comprising at least one of an additive and an aqueous-miscible fluid), the treatment fluid having a pH at or below that at which the carboxylic or phosphonic acid groups of the chelating agent are protonated and the chelating agent is ineffective for complexing a metal ion.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present disclosure may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. a method that includes providing a treatment fluid comprising an aqueous carrier fluid, an acid, and a chelating agent comprising N-(phosphonomethyl)iminodiacetic acid, the treatment fluid having a pH at or below that at which carboxylic or phosphonic acid groups of the N-(phosphonomethyl)iminodiacetic acid are protonated and the chelating agent is ineffective for complexing a metal ion; introducing the treatment fluid into a wellbore penetrating a subterranean formation comprising a carbonate mineral; reacting the acid with the carbonate mineral in the presence of the chelating agent, such that the acid at least partially spends as the pH of the treatment fluid rises; and complexing a metal ion with the chelating agent once the pH of the treatment fluid rises above a $pK_a$ value for one or more of the carboxylic or phosphonic acid groups of the N-(phosphonomethyl)iminodiacetic acid;

B. a method that includes providing a treatment fluid comprising an aqueous carrier fluid, an acid-generating compound, and a chelating agent comprising N-(phosphonomethyl)iminodiacetic acid, the treatment fluid having a pH at or below that at which carboxylic or phosphonic acid groups of the N-(phosphonomethyl)iminodiacetic acid are protonated and the chelating agent is ineffective for complexing a metal ion; introducing the treatment fluid into a wellbore penetrating a subterranean formation comprising a carbonate mineral; reacting an acid produced from the acid-generating compound with the carbonate mineral in the presence of the chelating agent, such that the acid at least partially spends as the pH of the treatment fluid rises; and complexing a metal ion with the chelating agent once the pH of the treatment fluid rises above a $pK_a$ value for one or more of the carboxylic or phosphonic acid groups of the N-(phosphonomethyl)iminodiacetic acid;

C. a treatment fluid that includes an aqueous carrier fluid; a chelating agent comprising N-(phosphonomethyl)iminodiacetic acid; at least one selected from the group consisting of an acid, an acid-generating compound, and any combination thereof; and wherein the treatment fluid has a pH at or below that at which carboxylic or phosphonic acid groups of the N-(phosphonomethyl)iminodiacetic acid are protonated and the chelating agent is ineffective for complexing a metal ion; and D. a system that includes a pump fluidly coupled to a tubular containing a treatment fluid of Embodiment C.

Each of embodiments A, B, C, and D may have one or more of the following additional elements in any combination: Element 1: wherein the treatment fluid further comprises an aqueous-miscible fluid; Element 2: wherein the treatment fluid is substantially free of hydrofluoric acid or a hydrofluoric acid-generating compound; Element 3: wherein the acid is selected from the group consisting of hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, and any combination thereof or wherein the acid-generating compound is selected from the group consisting of an ester, an aliphatic polyester, an orthoester, a poly(orthoester), a poly(lactide), a poly(glycolide), a poly(e-caprolactone), a poly(hydroxybutyrate), a poly(anhydride), ethylene glycol monoformate, ethylene glycol diformate, diethylene glycol diformate, glyceryl monoformate, glyceryl diformate, glyceryl triformate, triethylene glycol diformate, a formate ester of pentaerythritol, any derivative thereof, and any combination thereof; Element 4: wherein the treatment fluid further comprises an acid or an acid-generating compound; Element 5: wherein the treatment fluid comprises about 1% hydrochloric acid or greater by weight; Element 6: wherein the treatment fluid has a pH of about −1 to about 2; Element 7: wherein the chelating agent is about 0.1% to about 40% by weight of the treatment fluid; and Element 8: wherein the acid is at about 1% to about 70% by weight of the treatment fluid.

By way of non-limiting example, exemplary combinations applicable to A, B, C, and D include: Element 1 in combination with Element 2; Element 1 in combination with Element 3; Element 2 in combination with Element 4; Element 2 in combination with Element 5; Element 3 in combination with Element 4; Element 6 in combination with any of the foregoing; Element 6 in combination with one of Elements 1-5; Element 7 in combination with any of the foregoing; Element 7 in combination with one of Elements 1-6; Element 8 in combination with any of the foregoing; and Element 8 in combination with one of Elements 1-7.

Each of embodiments A and B may have one or more of the following additional elements in any combination (including in combination with any of Elements 1-8): Element 9: wherein introducing the treatment fluid into the wellbore is below a fracture gradient of the subterranean formation; Element 10: wherein introducing the treatment fluid into the wellbore is at or above a fracture gradient of the subterranean formation; Element 11: wherein the carbonate mineral comprises at least one selected from the group consisting of calcite, dolomite, and any combination thereof; Element 12: wherein the subterranean formation further comprises a siliceous material; Element 13: wherein the treatment fluid, before introducing in the subterranean formation, comprises about 1% hydrochloric acid or greater by weight; Element 14: wherein the subterranean formation has a temperature of about 125° F. or above; Element 15: wherein the metal ion is selected from the group consisting of a calcium ion, a magnesium ion, an aluminum ion, an iron ion, and any combination thereof; and Element 16: wherein reacting the acid with the carbonate mineral in the presence of the chelating agent comprises interacting the acid with the carbonate mineral in a manner to form one or more wormholes therein.

By way of non-limiting example, exemplary combinations applicable to A and B include: Element 12 in combination with Element 2 and optionally in further combination with Element 4; Element 13 in combination with Element 14 and optionally in further combination with Element 5; Element 13 in combination with Element 5; Element 11 in combination with Element 15; Element 3 in combination with Element 4; at least one of Elements 5-8 in combination with any of the foregoing; at least one of Elements 5-8 in combination with one of Elements 11-16; one of Elements 9-10 in combination with any of the foregoing; and one of Elements 9-10 in combination with one of Elements 1-8 and 11-16.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

To facilitate a better understanding of the embodiments of the present invention, the following examples of preferred or representative embodiments are given. In no way should the following examples be read to limit, or to define, the scope of the invention.

EXAMPLES

A sample was prepared with about 5% to about 10% by weight of N-(phosphonomethyl)iminodiacetic acid in 70% methanesulfonic acid w/v in water. Upon visual inspection no precipitates or phase separation occurred, which indicates solubilization of the N-(phosphonomethyl)iminodiacetic acid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid comprising an aqueous carrier fluid, an acid, and a chelating agent comprising N-(phosphonomethyl)iminodiacetic acid, the treatment fluid having a pH at or below that at which carboxylic or phosphonic acid groups of the N-(phosphonomethyl)iminodiacetic acid are protonated and the chelating agent is ineffective for complexing a metal ion;
   introducing the treatment fluid into a wellbore penetrating a subterranean formation comprising a carbonate mineral;
   reacting the acid with the carbonate mineral in the presence of the chelating agent, such that the acid at least partially spends as the pH of the treatment fluid rises; and
   complexing a metal ion with the chelating agent once the pH of the treatment fluid rises above a $pK_a$ value for one or more of the carboxylic or phosphonic acid groups of the N-(phosphonomethyl)iminodiacetic acid.

2. The method of claim 1, wherein the treatment fluid further comprises an aqueous-miscible fluid.

3. The method of claim 1, wherein introducing the treatment fluid into the wellbore is below a fracture gradient of the subterranean formation.

4. The method of claim 1, wherein introducing the treatment fluid into the wellbore is at or above a fracture gradient of the subterranean formation.

5. The method of claim 1, wherein the carbonate mineral comprises at least one selected from the group consisting of calcite, dolomite, and any combination thereof.

6. The method of claim 1, wherein the treatment fluid is substantially free of hydrofluoric acid or a hydrofluoric acid-generating compound.

7. The method of claim 6, wherein the subterranean formation further comprises a siliceous material.

8. The method of claim 1, wherein the acid is selected from the group consisting of hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, and any combination thereof.

9. The method of claim 8, wherein the treatment fluid, before introducing in the subterranean formation, comprises about 1% hydrochloric acid or greater by weight.

10. The method of claim 9, wherein the subterranean formation has a temperature of about 125° F. or above.

11. The method of claim 1, wherein the metal ion is selected from the group consisting of a calcium ion, a magnesium ion, an aluminum ion, an iron ion, and any combination thereof.

12. The method of claim 1, wherein reacting the acid with the carbonate mineral in the presence of the chelating agent comprises interacting the acid with the carbonate mineral in a manner to form one or more wormholes therein.

13. A treatment fluid comprising:
an aqueous carrier fluid;
a chelating agent comprising N-(phosphonomethyl)iminodiacetic acid;
at least one selected from the group consisting of an acid, an acid-generating compound, and any combination thereof; and
wherein the treatment fluid has a pH at or below that at which carboxylic or phosphonic acid groups of the N-(phosphonomethyl)iminodiacetic acid are protonated and the chelating agent is ineffective for complexing a metal ion.

14. The treatment fluid of claim 13 further comprising an aqueous-miscible fluid.

15. The treatment fluid of claim 13, wherein the treatment fluid is substantially free of hydrofluoric acid or a hydrofluoric acid-generating compound.

16. The treatment fluid of claim 13, wherein the acid is selected from the group consisting of hydrochloric acid, hydrobromic acid, hydrofluoric acid, formic acid, acetic acid, chloroacetic acid, dichloroacetic acid, trichloroacetic acid, fluoroacetic acid, difluoroacetic acid, trifluoroacetic acid, methanesulfonic acid, and any combination thereof.

17. The treatment fluid of claim 13, wherein the treatment fluid comprises about 1% hydrochloric acid or greater by weight.

18. The treatment fluid of claim 13, wherein the N-(phosphonomethyl)iminodiacetic acid is at about 0.1% to about 40% by weight of the treatment fluid.

19. The treatment fluid of claim 13, wherein the treatment fluid has a pH of about −1 to about 2.

20. A system comprising:
a pump fluidly coupled to a tubular;
the tubular containing a treatment fluid of claim 19.

* * * * *